US008117560B1

(12) United States Patent
Lu et al.

(10) Patent No.: US 8,117,560 B1
(45) Date of Patent: Feb. 14, 2012

(54) METHODS AND APPARATUSES FOR SELECTIVELY REMOVING SENSITIVE INFORMATION DURING A COLLABORATION SESSION

(75) Inventors: Defeng Lu, Santa Clara, CA (US);
Zhonghui Luo, Fremont, CA (US);
Steffen Matt, Santa Clara, CA (US);
Zheng Yuan, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 562 days.

(21) Appl. No.: 11/805,764

(22) Filed: May 23, 2007

Related U.S. Application Data

(63) Continuation-in-part of application No. 11/171,591, filed on Jun. 29, 2005.

(60) Provisional application No. 60/655,462, filed on Feb. 22, 2005.

(51) Int. Cl.
*G06F 3/048* (2006.01)
(52) U.S. Cl. .......................... 715/789; 715/781; 715/794
(58) Field of Classification Search .................. 715/781, 715/803, 804
See application file for complete search history.

(56) References Cited

U.S. PATENT DOCUMENTS

| | | | |
|---|---|---|---|
| 5,062,060 A * | 10/1991 | Kolnick ........................ 715/800 |
| 5,107,443 A | 4/1992 | Smith et al. |
| 5,522,025 A | 5/1996 | Rosenstein |
| 5,577,188 A | 11/1996 | Zhu |
| 5,623,603 A | 4/1997 | Jiang et al. |
| 5,758,110 A | 5/1998 | Boss et al. |
| 5,760,769 A | 6/1998 | Petrie |
| 5,805,846 A | 9/1998 | Nakajima et al. |
| 5,844,553 A | 12/1998 | Hao et al. |
| 5,944,791 A | 8/1999 | Scherpbier |
| 6,167,432 A | 12/2000 | Jiang |
| 6,223,212 B1 | 4/2001 | Batty et al. |
| 6,302,698 B1 | 10/2001 | Ziv-El |
| 6,308,199 B1 * | 10/2001 | Katsurabayashi ............ 709/204 |
| 6,329,984 B1 | 12/2001 | Boss et al. |
| 6,343,313 B1 | 1/2002 | Salesky et al. |
| 6,567,813 B1 | 5/2003 | Zhu et al. |
| 6,570,590 B1 | 5/2003 | Dubrow et al. |
| 6,601,087 B1 | 7/2003 | Zhu et al. |
| 6,654,032 B1 | 11/2003 | Zhu et al. |
| 6,674,992 B2 | 1/2004 | Helmick et al. |
| 6,691,154 B1 | 2/2004 | Zhu et al. |
| 6,694,379 B1 | 2/2004 | Hanko et al. |

(Continued)

FOREIGN PATENT DOCUMENTS

EP   06 73 5293   12/2010

OTHER PUBLICATIONS

U.S. Appl. No. 09/195,801, filed May 12, 2000, Zhu.

(Continued)

*Primary Examiner* — Boris Pesin
*Assistant Examiner* — Omar Abdul-Ali

(57) ABSTRACT

In one embodiment, the methods and apparatuses include: selectively sharing desktop content with an attendee device wherein the desktop content includes a shared window and a sliding type of window; displaying the desktop content including the sliding type of window on the presenter device; detecting a modification to the desktop content that is beneath the sliding type of window wherein the modification is performed by the attendee device; and excluding the sliding type of window from the desktop content for display on the attendee device.

20 Claims, 11 Drawing Sheets

U.S. PATENT DOCUMENTS

| | | |
|---|---|---|
| 6,757,733 B2 | 6/2004 | Gupta |
| 6,763,501 B1 | 7/2004 | Zhu et al. |
| 6,789,119 B1 | 9/2004 | Zhu et al. |
| 6,901,448 B2 | 5/2005 | Zhu et al. |
| 6,911,987 B1 | 6/2005 | Mairs et al. |
| 6,925,645 B2 | 8/2005 | Zhu et al. |
| 7,028,266 B2 * | 4/2006 | Ben-Shachar et al. ........ 715/790 |
| 7,069,298 B2 | 6/2006 | Zhu et al. |
| 7,089,279 B1 | 8/2006 | Sakaguchi |
| 7,222,305 B2 * | 5/2007 | Teplov et al. ................. 715/751 |
| 7,266,779 B2 | 9/2007 | Baek et al. |
| 7,284,203 B1 | 10/2007 | Meeks et al. |
| 7,392,286 B2 * | 6/2008 | Riddle .......................... 709/204 |
| 7,418,664 B2 * | 8/2008 | Ben-Shachar et al. ........ 715/753 |
| 2002/0194272 A1 | 12/2002 | Zhu |
| 2003/0164853 A1 | 9/2003 | Zhu et al. |
| 2003/0167301 A1 | 9/2003 | Zhu et al. |
| 2003/0167302 A1 | 9/2003 | Zhu et al. |
| 2003/0167418 A1 | 9/2003 | Zhu et al. |
| 2003/0182375 A1 | 9/2003 | Zhu et al. |
| 2003/1067304 | 9/2003 | Zhu et al. |
| 2003/1067339 | 9/2003 | Zhu et al. |
| 2003/0189601 A1 | 10/2003 | Ben-Shachar et al. |
| 2003/0206189 A1 * | 11/2003 | DeMello et al. .............. 345/711 |
| 2005/0033817 A1 | 2/2005 | Wei |
| 2005/0132045 A1 | 6/2005 | Hornback et al. |
| 2005/0165859 A1 | 7/2005 | Geyer et al. |
| 2006/0010392 A1 * | 1/2006 | Noel et al. .................... 715/759 |

OTHER PUBLICATIONS

U.S. Appl. No. 09/835,116, filed Apr. 13, 2001, Wei.
U.S. Appl. No. 09/835,086, filed Apr. 13, 2001, Wei.
PCT Notification of Transmittal of the International Search Report and Written Opinion of the International Searching Authority of the Declaration for PCT Counterpart Application No. PCT/US06/05567 Containing International Search Report, 8 pgs. (Mar. 4, 2008).

* cited by examiner

400

1. Participant ID 410

2. Select Hidden Window 420

3. Default Setting 430

Figure 4

METHODS AND APPARATUSES FOR SELECTIVELY REMOVING SENSITIVE INFORMATION DURING A COLLABORATION SESSION

RELATED INVENTIONS

This application is a continuation-in-part of co-pending U.S. patent application Ser. No. 11/171,591, filed on Jun. 29, 2005 which claims the benefit of provisional Application No. 60/655,462, filed Feb. 22, 2005.

FIELD OF INVENTION

The present invention relates generally to selectively removing sensitive information and, more particularly, to selectively removing sensitive information during a collaboration session.

BACKGROUND

There has been an increased use in collaboration sessions that are Internet or web-based to communicate with employees, vendors, and clients. During these collaboration sessions, information is typically exchanged between multiple participants. This exchanged information may include audio, graphical, and/or textual information. For simplicity, it is sometimes is desirable to conduct a collaboration session by sharing the presenter's entire desktop while preserving confidential items.

SUMMARY

In one embodiment, the methods and apparatuses include: selectively sharing desktop content with an attendee device wherein the desktop content includes a shared window and a sliding type of window; displaying the desktop content including the sliding type of window on the presenter device; detecting a modification to the desktop content that is beneath the sliding type of window wherein the modification is performed by the attendee device; and excluding the sliding type of window from the desktop content for display on the attendee device.

BRIEF DESCRIPTION OF THE DRAWINGS

The accompanying drawings, which are incorporated in and constitute a part of this specification, illustrate and explain one embodiment of the methods and apparatuses for selectively removing sensitive information during a collaboration session. In the drawings.

FIG. 4 is an exemplary record for use with the methods and apparatuses for selectively removing sensitive information during a collaboration session;

DETAILED DESCRIPTION

The following detailed description of the methods and apparatuses for selectively removing sensitive information during a collaboration session refers to the accompanying drawings. The detailed description is not intended to limit the methods and apparatuses for selectively removing sensitive information during a collaboration session. Instead, the scope of the methods and apparatuses for selectively removing sensitive information during a collaboration session is defined by the appended claims and equivalents. Those skilled in the art will recognize that many other implementations are possible, consistent with the present invention.

References to a device include a device utilized by a user such as a desktop computer, a portable computer, a personal digital assistant, a video phone, a landline telephone, a cellular telephone, and a device capable of receiving/transmitting an electronic signal.

References to content include audio, video, graphical, and/or textual data.

References to a window are directed to an area utilized to display the content.

References to a desktop are directed to an entire portion of a display area of a corresponding device.

References to a collaboration session include a plurality of devices that are configured to view content submitted by one of the devices.

References to a participant device include devices that are participating in the collaboration session.

References to a presenter device include a device that is participant and shares content shared with other participants.

References to an attendee device include a device that is a participant and receives content shared by another participant device. The attendees are capable of view content that is offered by the presenter device. In some instances, the attendee devices are capable of modifying the content shared by the presenter device.

In one embodiment, the methods and apparatuses for selectively removing sensitive information during a collaboration session allow a presenter device to share desktop content associated with the presenter device to an attendee device while preventing the attendee device from gaining access to private content shown within a particular window that is shown to the presenter device within the desktop content. In one embodiment, the private content shown within the particular window is part of the desktop content associated with the presenter device. Further, the attendee device is capable of viewing the desktop content associated with the presenter device while excluding the private content shown within the particular window.

Figure 1:
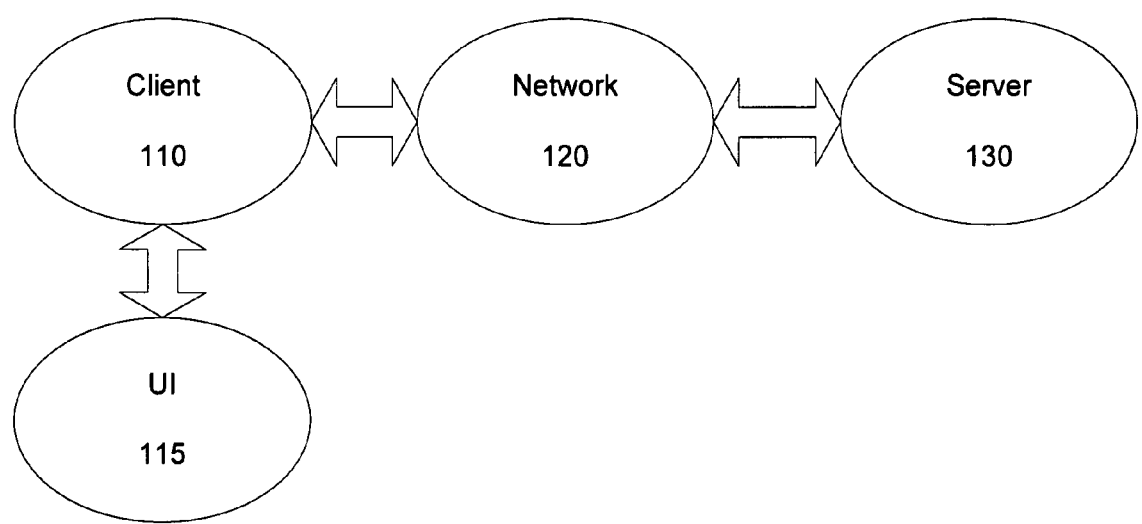
FIG. 1 is a diagram illustrating an environment within which the methods and apparatuses for selectively removing sensitive information during a collaboration session are implemented.

FIG. 1 is a diagram illustrating an environment within which the methods and apparatuses for selectively removing sensitive information during a collaboration session are implemented. The environment includes an electronic device 110 (e.g., a computing platform configured to act as a client device, such as a computer, a personal digital assistant, and the like), a user interface 115, a network 120 (e.g., a local area network, a home network, the Internet), and a server 130 (e.g., a computing platform configured to act as a server).

In one embodiment, one or more user interface 115 components are made integral with the electronic device 110 (e.g., keypad and video display screen input and output interfaces in the same housing such as a personal digital assistant. In other embodiments, one or more user interface 115 components (e.g., a keyboard, a pointing device such as a mouse, a trackball, etc.), a microphone, a speaker, a display, a camera are physically separate from, and are conventionally coupled to, electronic device 110. In one embodiment, the user utilizes interface 115 to access and control content and applications stored in electronic device 110, server 130, or a remote storage device (not shown) coupled via network 120.

In accordance with the invention, embodiments of selectively removing sensitive information during a collaboration session below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
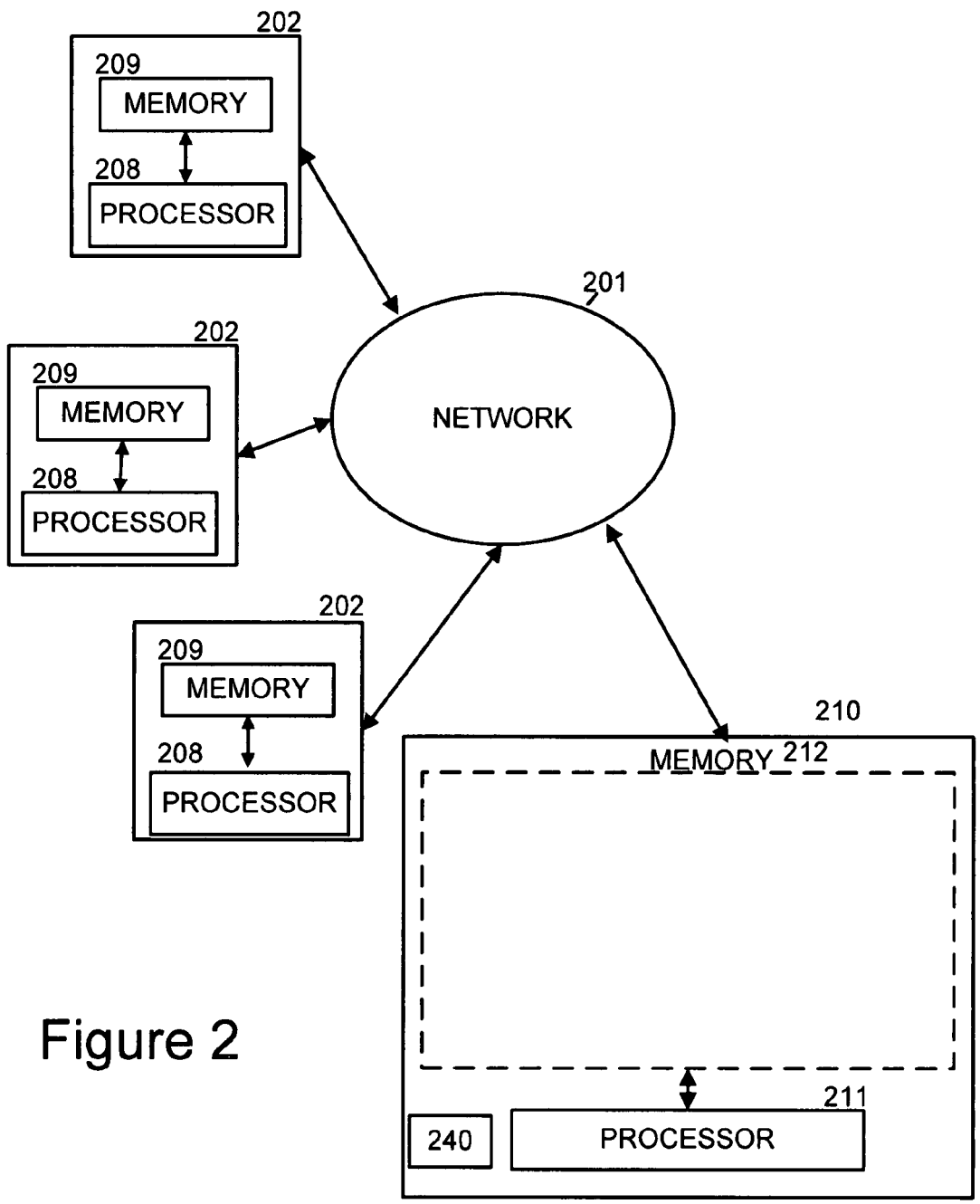
FIG. 2 is a simplified block diagram illustrating one embodiment in which the methods and apparatuses for selectively removing sensitive information during a collaboration session are implemented.

FIG. 2 is a simplified diagram illustrating an exemplary architecture in which the methods and apparatuses for selectively removing sensitive information during a collaboration session are implemented. The exemplary architecture includes a plurality of electronic devices 202, a server device 210, and a network 201 connecting electronic devices 202 to server 210 and each electronic device 202 to each other. The plurality of electronic devices 202 are each configured to include a computer-readable medium 209, such as random access memory, coupled to an electronic processor 208. Processor 208 executes program instructions stored in the computer-readable medium 209. In one embodiment, a unique user operates each electronic device 202 via an interlace 115 as described with reference to FIG. 1.

The server device 130 includes a processor 211 coupled to a computer-readable medium 212. In one embodiment, the server device 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

In one embodiment, the plurality of client devices 202 and the server 210 include instructions for a customized application for selectively removing sensitive information during a collaboration session. In one embodiment, the plurality of computer-readable media 209 and 212 contain, in part, the customized application. Additionally, the plurality of client devices 202 and the server 210 are configured to receive and transmit electronic messages for use with the customized application. Similarly, the network 210 is configured to transmit electronic messages for use with the customized application.

One or more user applications are stored in media 209, in media 212, or a single user application is stored in part in one media 209 and in part in media 212. In one instance, a stored user application, regardless of storage location, is made customizable based on selectively removing sensitive information during a collaboration session as determined using embodiments described below.

Figure 3:
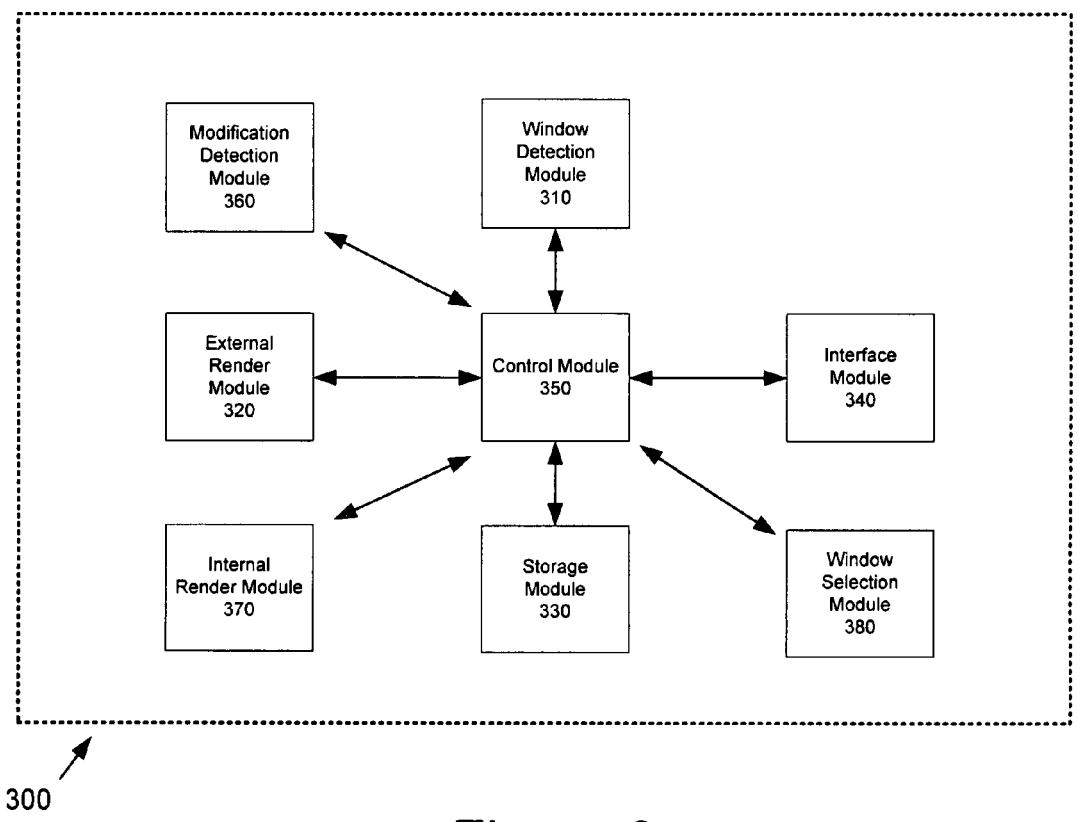
FIG. 3 is a simplified block diagram illustrating a system, consistent with one embodiment of the methods and apparatuses for selectively removing sensitive information during a collaboration session.

FIG. 3 illustrates one embodiment of a system 300. In one embodiment, the system 300 is embodied within the server 130. In another embodiment, the system 300 is embodied within the electronic device 110. In yet another embodiment, the system 300 is embodied within both the electronic device 110 and the server 130.

In one embodiment, the system 300 includes a window detection module 310, an external render module 320, a storage module 330, an interface module 340, a control module 350, a modification detection module 360, an internal render module 370, and a window selection module 380.

In one embodiment, the control module 350 communicates with the window detection module 310, the external render module 320, the storage module 330, the interface module 340, the modification detection module 360, the internal render module 370, and the window selection module 380. In one embodiment, the control module 350 coordinates tasks, requests, and communications between the window detection module 310, the external render module 320, the storage module 330, the interface module 340, the modification detection module 360, the internal render module 370, and the window selection module 380.

In one embodiment, the window detection module 310 detects a window that is utilized by a participant device that is acting as a presenter device. In one embodiment, the window is utilized to view content. In one embodiment, the window is utilized to view content that is part of the collaboration session. In another embodiment, the window is utilized to view confidential information. The window detection module 310 is configured to detect any number of windows utilized to display content within a desktop of the presenter device.

In another embodiment, a sliding type of window is detected. In one embodiment, the sliding type of windows is utilized to alert the participant device that a new message is received by the device. In some instances, content associated with the sliding type of window is confidential and desirable to keep private from others. In one embodiment, the sliding type of window is detected through an API call through the system 300 within the window detection module 310.

In one embodiment, the external render module 320 renders content for display on participant devices that are attendee devices of the collaboration session.

In one embodiment, the interface detection module 340 detects when the cursor is moved on the device participating in the collaboration session. In another embodiment, the interface detection module 340 monitors the voice transmissions originating from the device participating in the collaboration session. In yet another embodiment, the interface detection module 340 detects any activity by the device participating in the collaboration session.

In one embodiment, the storage module 330 stores a record including a profile associated with the each device participating in a collaboration session. An exemplary profile is shown in a record 400 within FIG. 4.

In one embodiment, the interface module 340 receives a signal from one of the electronic devices 110. In one embodiment, the electronic devices 110 are participating in a collaboration session. In another embodiment, the interface module 340 delivers a signal to one of the electronic devices 110.

In one embodiment, the modification detection module 360 monitors the changes or modifications to the content that are obstructed by viewing private content on a presenter device. In one embodiment, the attendee device modifies the content that is shared by the presenter device, and the content that is modified by the attendee is not seen by the presenter device due to other private content that blocks the view of the presenter device.

In one embodiment, the internal render module 370 renders content for display on the presenter device within the collaboration session.

In one embodiment, the window selection module 380 selects the windows or content areas that are to be displayed on the presenter device and kept private from the attendee device(s).

The system 300 in FIG. 3 is shown for exemplary purposes and is merely one embodiment of the methods and apparatuses for selectively removing sensitive information during a collaboration session. Additional modules may be added to the system 300 without departing from the scope of during a collaboration session. Similarly, modules may be combined or deleted without departing from the scope of the methods and apparatuses for selectively removing sensitive information during a collaboration session.

FIG. 4 illustrates an exemplary record 400 for use with the methods and apparatuses for selectively removing sensitive information during a collaboration session. In one embodiment, the record 400 illustrates an exemplary record associated with the profile information of a particular participant device during a collaboration session.

In one embodiment, there are multiple records such that each record 400 is associated with a particular participant device. Further, each device corresponds with multiple records wherein each record 400 for a particular device corresponds to a particular collaboration session.

In one embodiment, the record 400 includes a participant device identity field 410, a selected hidden window field 420, and a default settings field 430. In one embodiment, the record 400 resides within the storage module 330. In one embodiment, the record 400 describes attributes detected through the system 300.

In one embodiment, the participant device identity field 410 includes information related to the unique identity of the participant device. In one embodiment, a unique name of the user of the participant device is utilized within the participant device identity field 410. In another embodiment, a unique number identifier is utilized within the participant device identity field 410.

In one embodiment, the selected hidden window field 420 identifies which window(s) the device identified within the participant identification wishes to exclude from being seen by other participant devices within the collaboration session.

In one embodiment, the device designates the specific window(s) that are to be excluded from being viewed by other participant devices. For example, a chat window with a particular participant device may be identified and excluded from being viewed by other participant devices. Although the chat window may be included within the desktop of the presenter device, the chat window is marked as a hidden window and is excluded from view of the attendee device(s).

In another embodiment, the device designates a class of windows that are to be excluded from being viewed by other participant devices. For example, any chat windows visible at the presenter device may be identified and excluded from being viewed by other participants. In another example, any windows belonging to a particular application may be identified and excluded from being viewed by other participants. For example, windows that are related to Outlook® can be identified and excluded from being viewed by other participants. Further, the sliding type of window may also be excluded from being viewed by other participant devices.

In one embodiment, the default settings field 430 includes predetermined settings that indicate types of windows that are to be identified and excluded from being viewed by other participants.

The flow diagrams as depicted in FIGS. 5, 6, 7 and 8 are one embodiment of the methods and apparatuses for selectively removing sensitive information during a collaboration session. The blocks within the flow diagrams can be performed in a different sequence without departing from the spirit of the methods and apparatuses for selectively removing sensitive information during a collaboration session. Further, blocks can be deleted, added, or combined without departing from the spirit of the methods and apparatuses for selectively removing sensitive information during a collaboration session.

Figure 5:
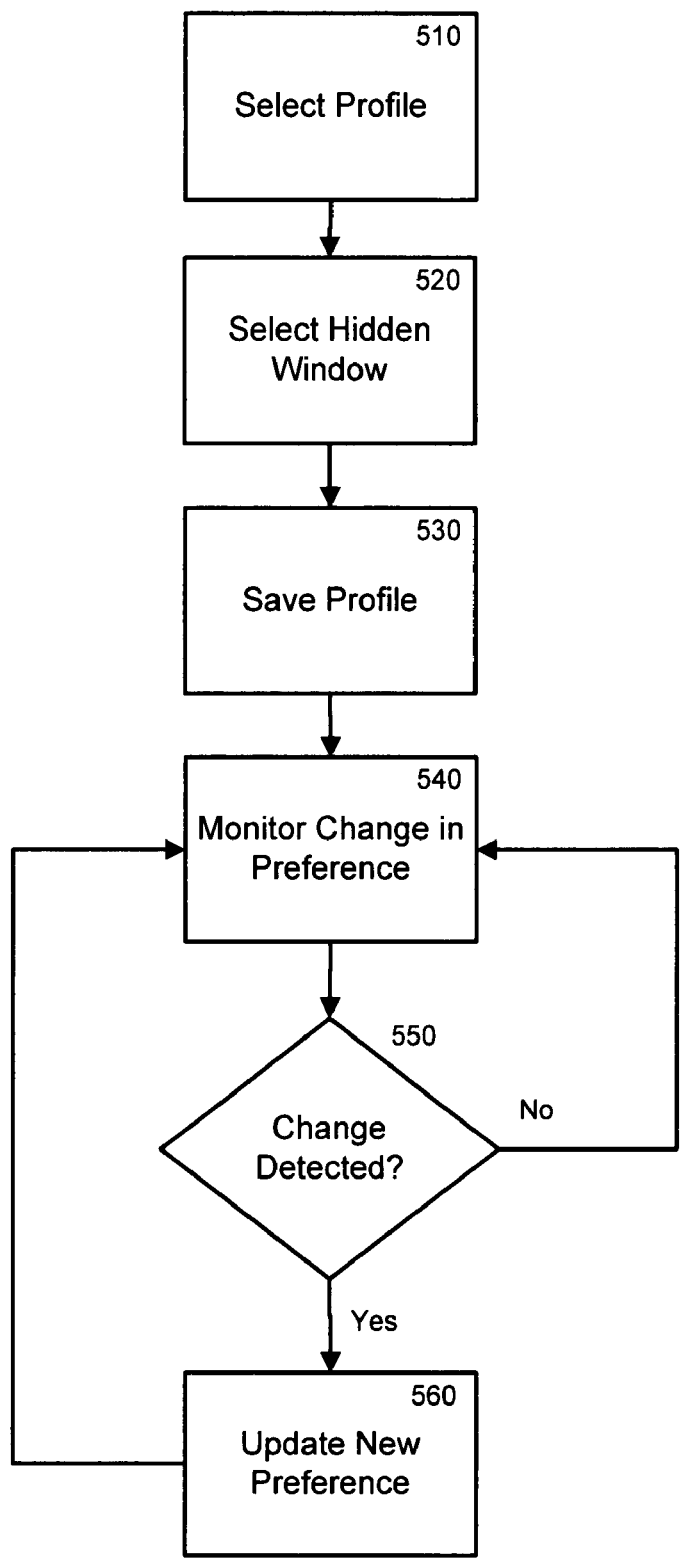
FIG. 5 is a flow diagram consistent with one embodiment of the methods and apparatuses for selectively removing sensitive information during a collaboration session.

The flow diagram in FIG. 5 illustrates refining the profile of a user of the participant device for a collaboration session according to one embodiment of the invention.

In Block 510, the particular profile is selected by a user of a participant device. In one embodiment, the user's identity is authenticated by a user identification. In another embodiment, the user's identity is further confirmed by a log-in routine including but not limited to a password.

In Block 520, a hidden window is selected by the user in association with the particular profile. When a window is selected to be a hidden window, the content displayed within this window is configured to be shown to the user of the participant device associated with the particular profile and hidden from other participant devices.

For example, during a collaboration session attended by a first participant device and a second participant device, if a window is selected as hidden by a user utilizing a first participant device, then this hidden window could be viewed by the first participant device and hidden from a second participant device. Further, this hidden window stays hidden from the second participant device even when the first participant device is the presenter device and the second participant device is the attendee device during the collaboration session where the desktop of the first participant device is shared with the second participant device.

In one embodiment, the hidden window is selected by identifying a particular window such as a chat window between the first participant device and another party. For example, a participant device may identify chat windows that occur between the participant device and another particular party.

In another embodiment, the hidden window is selected by identifying windows associated with a particular application that the particular user wishes to exclude others from viewing. An exemplary class of windows includes all files associated with Outlook® including electronic messages, calendaring reminders, and the like.

In another embodiment, the hidden window is selected by identifying a window type. In one instance, the sliding type of window is selected to exclude other participants from viewing.

In Block 530, the profile is stored which includes a window status that indicates whether the window is hidden or shared. In one embodiment, the profile is stored within a record such as the record 400 of FIG. 4.

In Block 540, the participant device is monitored for changing preferences of a hidden window. For example, if the user shares a window that is currently hidden, then the change is detected. Similarly, if the user makes a window hidden that is currently shared with other participant devices, then the change is also detected. In one embodiment, the changes to the window status is made in real time during the collaboration session.

If a change to the window status is detected in Block 550, then the new window status is updated in Block 560. In one embodiment, the window status is continually monitored in Block 540.

If a change to the window status is not detected in Block 550, then the window status is continually monitored in Block 540.

Figure 6:
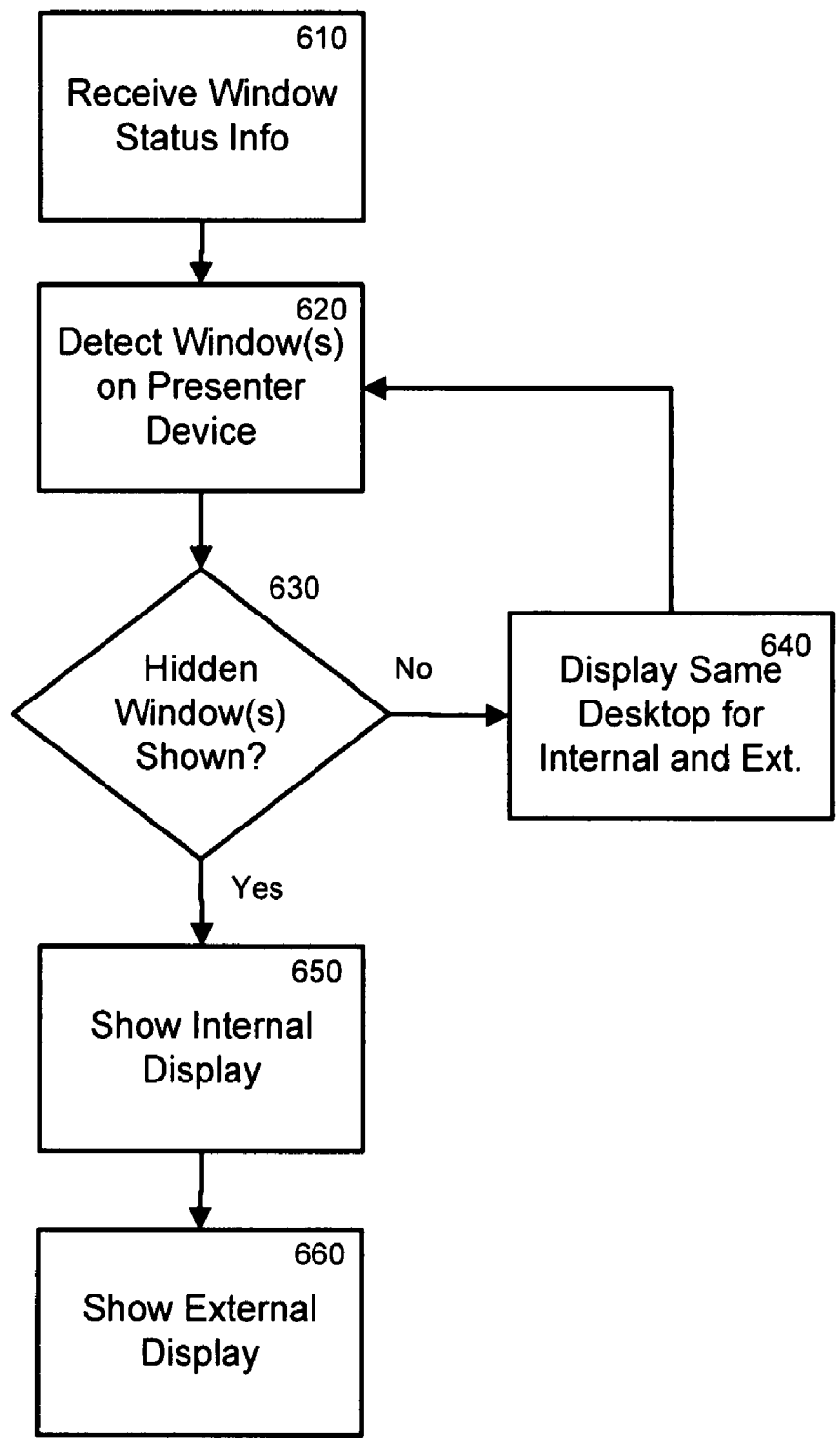
FIG. 6 is a flow diagram consistent with one embodiment of the methods and apparatuses for selectively removing sensitive information during a collaboration session.

The flow diagram in FIG. 6 illustrates sharing a desktop from a presenter device to a participant device during collaboration session according to one embodiment of the invention.

In Block 610, window status information associated with a presenter device of a collaboration session is received. In one embodiment, the window status information describes whether a window is shared or hidden. In one embodiment, the window status information is stored within the record 400 in FIG. 4. In one embodiment, the window status information for each window within the desktop of the presenter device is received. In one embodiment, a type of window may be selected and designated as a hidden window. For example, a sliding type of window may be designated as one of the hidden windows.

In Block 620, the windows currently displayed on the presenter device are detected. In one embodiment, various information regarding the window is detected such as applications associated with the window, title of the window, and the like.

In Block 630, if there are no hidden windows shown on the presenter device, then the images displayed by the external render module 320 and the internal render module 370 are the same and are displayed in Block 640. In one embodiment, the images displayed by the internal render module 370 are shown on the presenter device, and the images displayed by the external render module 320 are shown on the attendee device(s).

In Block 630, if there is a hidden window shown on the presenter device, then the images displayed by the external render module 320 are displayed in Block 660, and the images displayed by the internal render module 370 are displayed in Block 650.

In Block 650, the internal render module 370 displays images to the presenter device. In one embodiment, a hidden window is displayed simultaneously with the any shared content associated with the collaboration session on the desktop of the presenter device.

In some instances, windows are layered on top of each other. In one example, the hidden window is shown on top of the shared content. Illustrations showing hidden windows displayed on top of shared content are shown in subsequent figures and are described below. In one embodiment, the hidden window completely blocks out the shared content that is under the hidden window. In another embodiment, the hidden window is semi-transparent and allows a view of the shared content that is under the hidden window.

In one embodiment, the hidden window is visually distinguishable from the shared window when viewed by the presenter device. In one embodiment, the hidden window and the shared window are shown displayed in different colors, patterns, and the like to visually distinguish between the hidden and shared windows as displayed on the presenter device.

In Block 660, the external render module 320 displays images to the attendee device(s). In one embodiment, the shared window is shown to the attendee device(s). However, the hidden window is not displayed to the attendee device(s).

Figure 7:
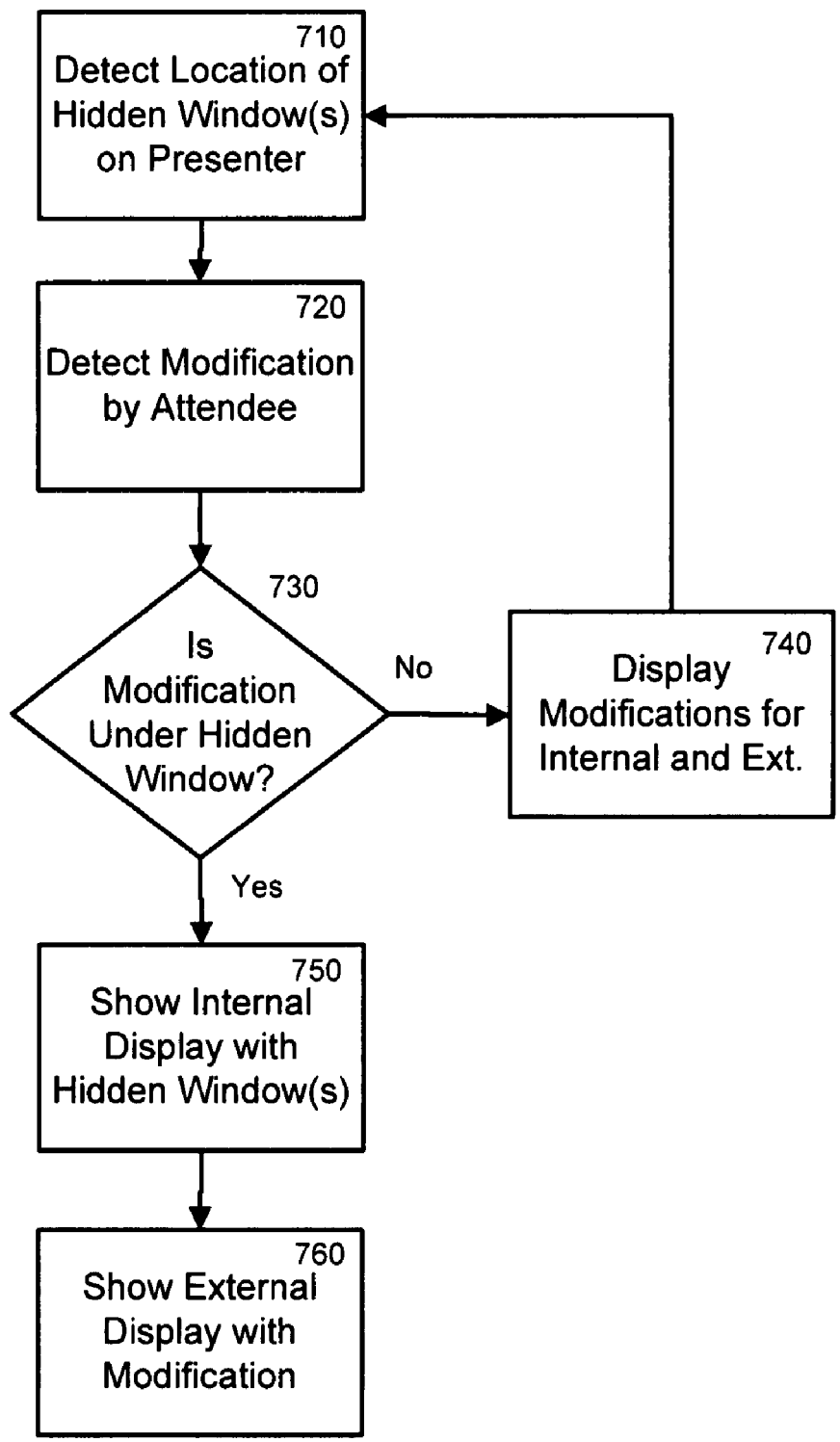
FIG. 7 is a flow diagram consistent with one embodiment of the methods and apparatuses for selectively removing sensitive information during a collaboration session.

The flow diagram in FIG. 7 illustrates sharing a desktop from a presenter device to a participant device during collaboration session according to one embodiment of the invention.

In Block 710, a hidden window currently displayed on the presenter device is detected. In one embodiment, the hidden window is determined through the window status information as described in the Block 610.

In Block 720, a modification by the attendee device to the content displayed on a shared window accessible to both the presenter device and the attendee device is detected.

In one embodiment, the modification includes annotations to the content, deletion of content, or adding additional content.

In Block 730, if the modification to the content within the shared window is not positioned under a hidden window, then the modified content displayed by the external render module 320 and the internal render module 370 are the same and are displayed in Block 640. In one embodiment, the modified content displayed by the internal render module 370 is shown on the presenter device, and the modified content displayed by the external render module 320 is shown on the attendee device(s).

In Block 730, if the modification to the content within the shared window is positioned under a hidden window, then the modified content displayed by the external render module 320 is displayed in Block 760, and the modified content displayed by the internal render module 370 is displayed in Block 750.

In Block 750, the internal render module 370 displays the hidden window to the presenter device. In one embodiment, a portion of the modified content that is not covered by the hidden window is displayed to the presenter device simultaneously with the hidden window.

In one embodiment, the hidden window is opaque and completely covers the modified content that is under the hidden window. In this embodiment, the modified content that is under the hidden window is not displayed to the presenter device.

In another embodiment, the hidden window is semi-transparent and partially covers the modified content that is under the hidden window. In this embodiment, the modified content that is under the hidden window is partially displayed to the presenter device. Further, the modified content is displayed to the presenter device as the modified content is changed.

In Block 760, the external render module 320 displays the modified content to the attendee device. In one embodiment, the shared window is shown to the attendee device. However, the hidden window is not displayed to the attendee device.

Figure 8:
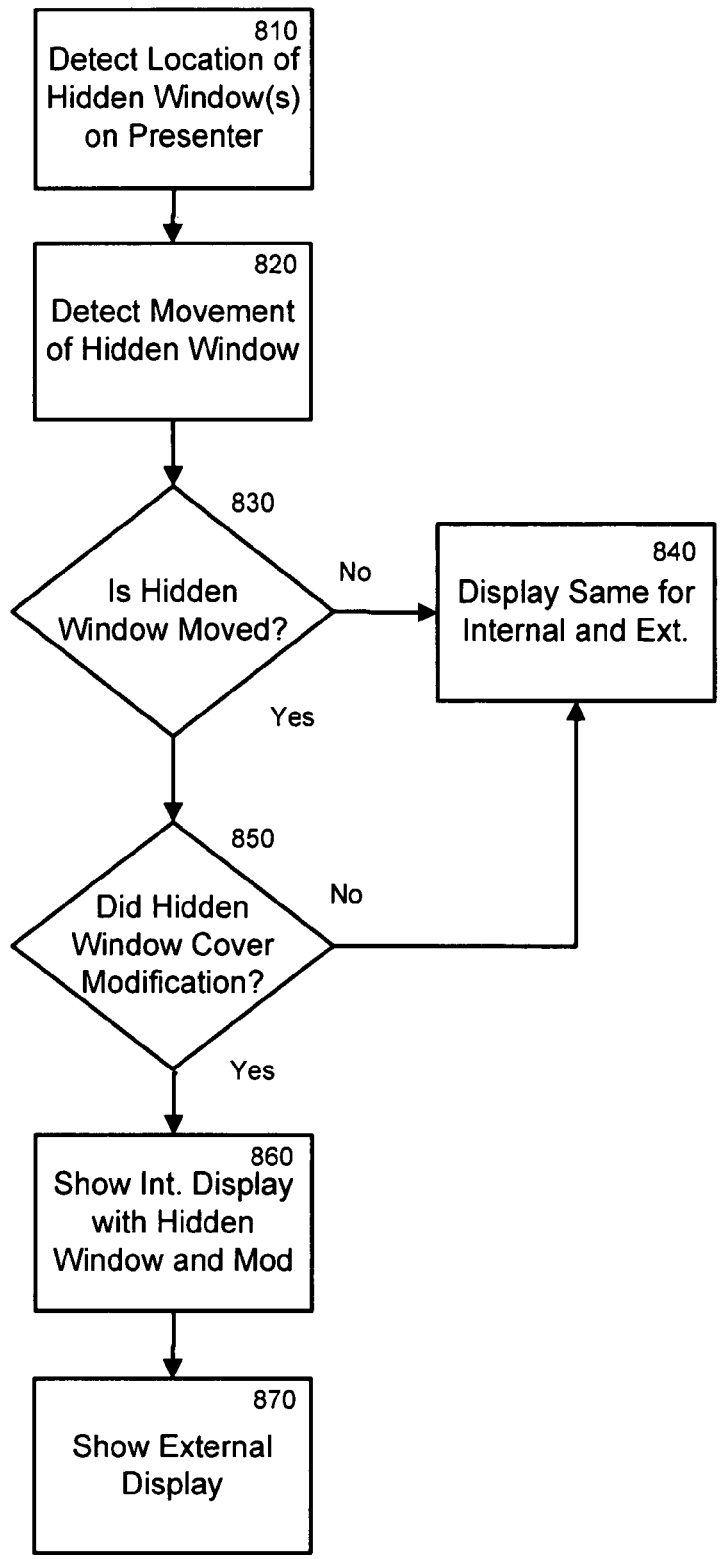
FIG. 8 is a flow diagram consistent with one embodiment of the methods and apparatuses for selectively removing sensitive information during a collaboration session.

The flow diagram in FIG. 8 illustrates displaying screens to the participant devices a collaboration session according to one embodiment of the invention.

In Block 810, a hidden window currently displayed on the presenter device is detected. In one embodiment, the hidden window is determined through the window status information.

In Block 820, a movement of the hidden window is detected. In one embodiment, the movement of the hidden window includes enlarging the hidden window, minimizing the hidden window, move the location of the hidden window, and the like.

In Block 830, if a movement of the hidden window is not detected, then the modified content displayed by the external render module 320 and the internal render module 370 are the same and are displayed in Block 840. In one embodiment, the modified content is displayed within a shared window and includes annotations to the content, deletion of content, or adding additional content made by either the attendee device or the presenter device.

In Block 830, if a movement of the hidden window is detected, then it is determined in Block 850 whether the hidden window covered the modified content.

In Block 850, if the hidden window did not cover the modified content, then the modified content displayed by the external render module 320 and the internal render module 370 are the same and are displayed in Block 840.

In Block 850, if the hidden window covered the modified content, then the internal render module 370 displays the hidden window in a new location and the modified content that was covered by the hidden window in the original location to the presenter device in Block 860. In one embodiment, a portion of the modified content that is not covered by the hidden window is displayed to the presenter device simultaneously with the hidden window.

In Block 870, the external render module 320 displays the modified content to the attendee device. In one embodiment, the shared window is shown to the attendee device. However, the hidden window is not displayed to the attendee device.

Exemplary screen shots illustrating the desktops of a presenter device and an attendee device while participating in a collaboration session are shown in FIGS. 9A, 9B, 10A, 10B, 11A, and 11B.

Figure 9A:
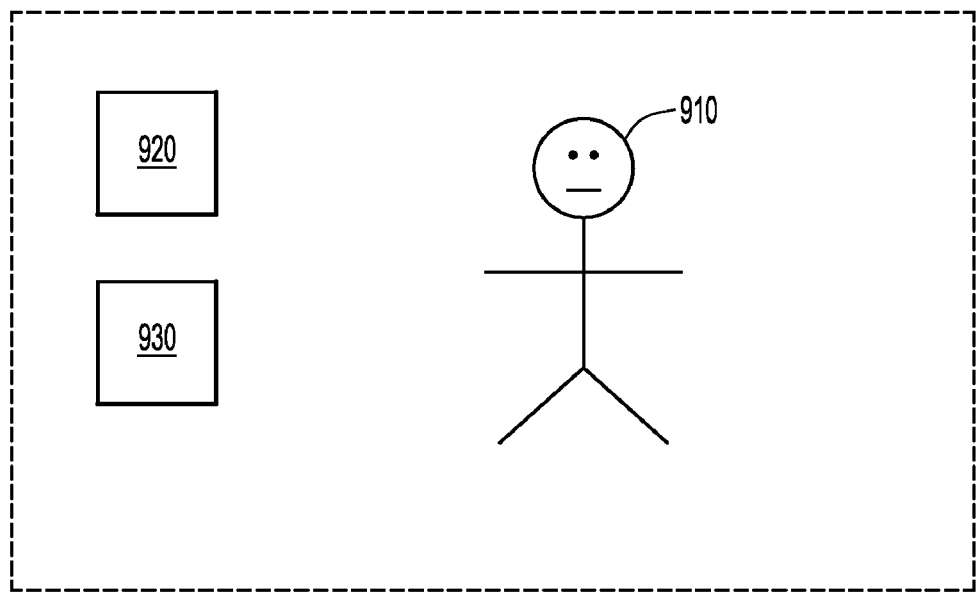
FIGS. 9A, 9B, 10A, 10B, 11A, and 11B illustrate an exemplary desktop showing one embodiment of the methods and apparatuses for selectively removing sensitive information during a collaboration session.

FIG. 9A illustrates a presenter desktop 900 that shows an exemplary desktop displayed by a presenter device. In one embodiment, the presenter desktop 900 includes objects such as a person 910, a window 920, and a window 930.

Figure 9B:
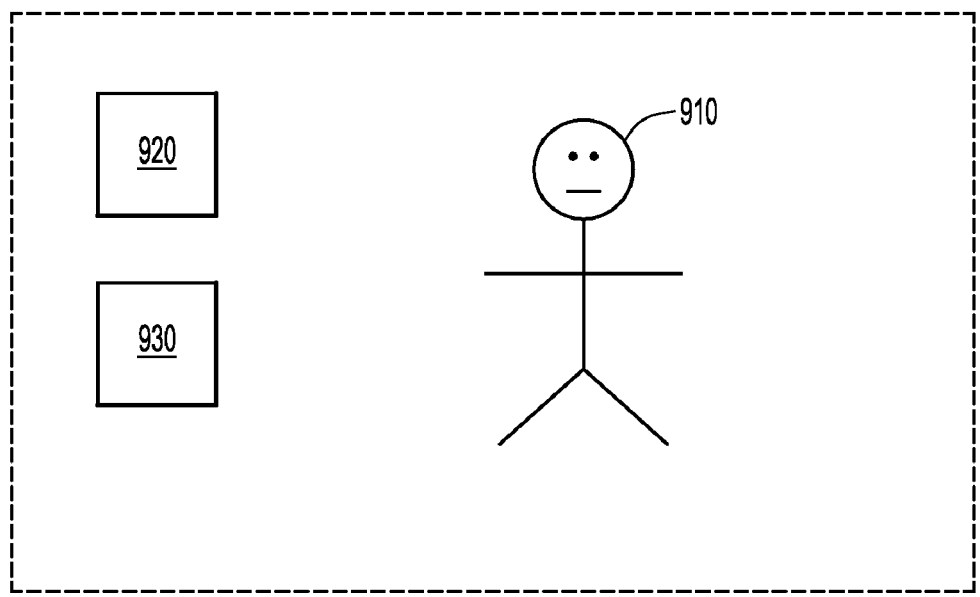

FIG. 9B illustrates an attendee desktop 950 that shows an exemplary desktop displayed by an attendee device during a collaboration session with the presenter device. In one embodiment, the attendee desktop 950 reflects a shared desktop by the presenter desktop 900 as shown in FIG. 9A. For the sake of clarity, common elements between the presenter desktop 900 and the attendee desktop 950 also share common reference numbers. For example, the person 910, the window 920, and the window 930 of the attendee desktop 950 correspond with common element number of the presenter desktop 900.

In one embodiment, the presenter desktop 900 contains no hidden windows. Because there are no hidden windows, the person 910, the window 920, and the window 930 of the presenter desktop 900 are also shown on the attendee desktop 950.

Figure 10A:
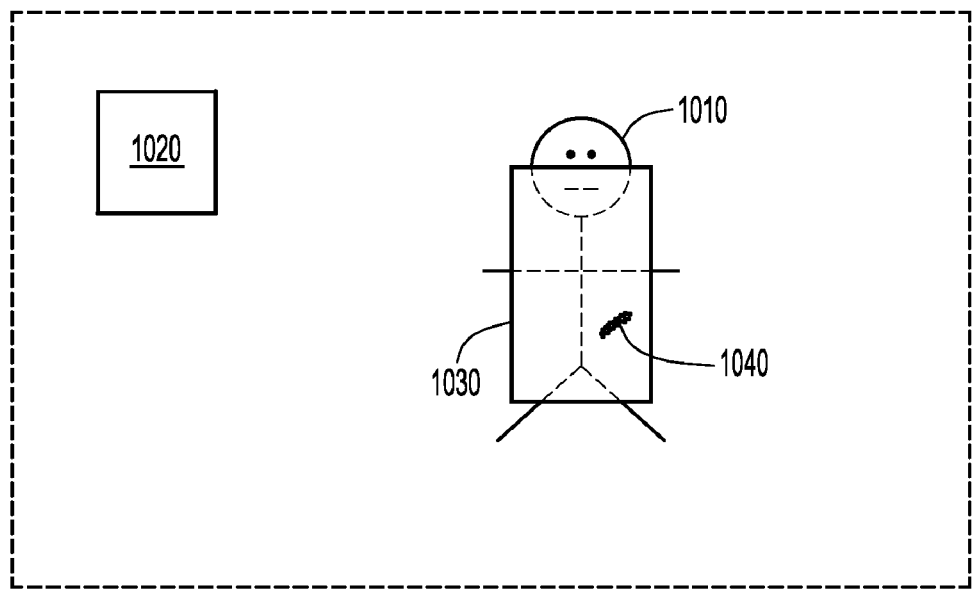

FIG. 10A illustrates a presenter desktop 1000 that shows an exemplary desktop displayed by a presenter device. In one embodiment, the presenter desktop 1000 includes a person 1010, a window 1020, a window 1030, and an annotation 1040.

Figure 10B:
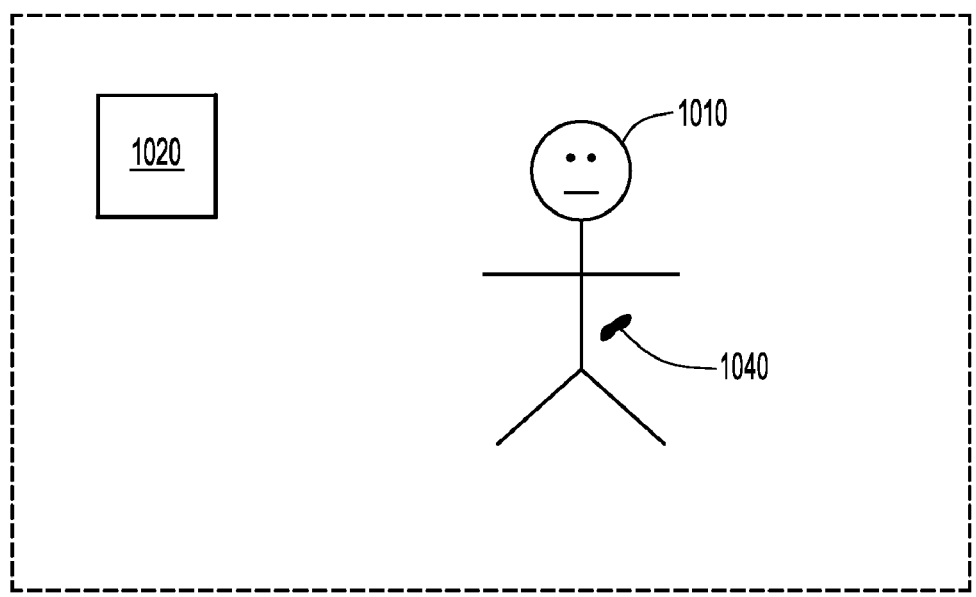

FIG. 10B illustrates an attendee desktop 1050 that shows an exemplary desktop displayed by an attendee device during a collaboration session with the presenter device. In one embodiment, the attendee desktop 1050 reflects a shared desktop by the presenter desktop 1000 as shown in FIG. 10A. For the sake of clarity, common elements between the presenter desktop 1000 and the attendee desktop 1050 also share common reference numbers. For example, the person 1010, the window 1020, and the annotation 1040 of the attendee desktop 1050 correspond with common element number of the presenter desktop 1000.

In one embodiment, the presenter desktop 1000 includes the window 1030 as a hidden window. Because the window 1030 is a hidden window, the person 1010, the window 1020, and the annotation 1040 of the presenter desktop 1000 are shown on the attendee desktop 1050.

In one embodiment, the presenter desktop 1000 shows the window 1030 positioned partially covering the person 1010 and completely covering the annotation 1040. In one embodiment, the window 1030 is semi-transparent and allows a partial view of the person 1010 and the annotation 1040 that is covered by the window 1030 on the presenter desktop 1000. In another embodiment, the window 1030 is opaque and portions of the person 1010 and the annotation 1040 that are covered by the window 1030 on the presenter desktop 1000.

In one embodiment, the presenter desktop 1000 includes the window 1030 as a hidden window. Because the window 1030 is a hidden window, the person 1010, the window 1020, and the annotation 1040 of the presenter desktop 1000 are also shown on the attendee desktop 1050.

In one embodiment, the presenter desktop 1000 shows the window 1030 positioned partially covering the person 1010 and completely covering the annotation 1040. In one embodiment, the window 1030 is semi-transparent and allows a partial view of the person 1010 and the annotation 1040 that is covered by the window 1030 on the presenter desktop 1000. In another embodiment, the window 1030 is opaque and portions of the person 1010 and the annotation 1040 that are covered by the window 1030 on the presenter desktop 1000.

In one embodiment, the annotation 1040 was created by the attendee device on the desktop shared by the presenter device.

In one embodiment, the attendee desktop 1050 directs the person 1010 to become animated. In this embodiment, the window 1030 is semi-transparent and allows the person 1010 to be partially viewed on the presenter desktop with the animation as directed by the attendee desktop.

Figure 11A:
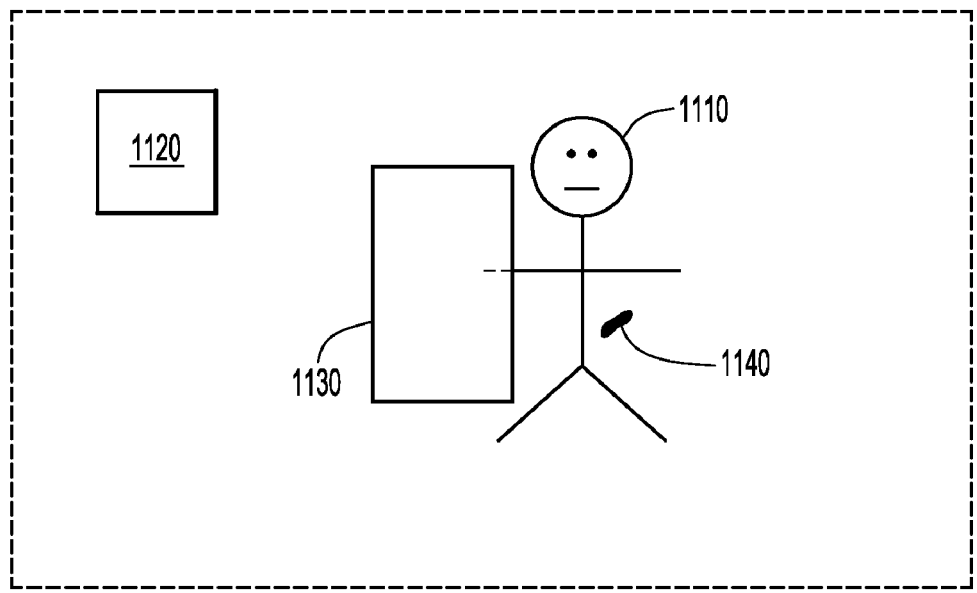

FIG. 11A illustrates a presenter desktop 1100 that shows an exemplary desktop displayed by a presenter device. In one embodiment, the presenter desktop 1100 includes a person 1110, a window 1120, a window 1130, and an annotation 1140.

Figure 11B:
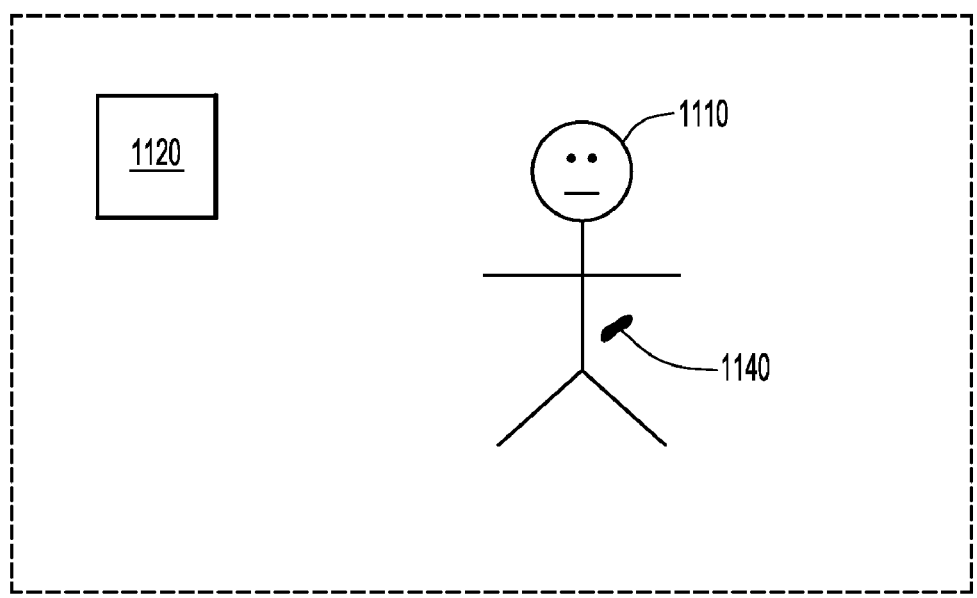

FIG. 11B illustrates an attendee desktop 1150 that shows an exemplary desktop displayed by an attendee device during a collaboration session with the presenter device. In one embodiment, the attendee desktop 1150 reflects a shared desktop by the presenter desktop 1100 as shown in FIG. 11A. The attendee desktop 1150 is a representative view of the presenter desktop 1100. For the sake of clarity, common elements between the presenter desktop 1100 and the attendee desktop 1150 also share common reference numbers. For example, the person 1110, the window 1120, and the annotation 1140 of the attendee desktop 1150 correspond with common element number of the presenter desktop 1100.

In one embodiment, the presenter desktop 1100 includes the window 1130 as a hidden window. Because the window 1130 is a hidden window, the person 1110, the window 1120, and the annotation 1140 of the presenter desktop 1100 are also shown on the attendee desktop 1150.

In one embodiment, the presenter desktop 1100 shows the window 1130 positioned partially covering the person 1110. In one embodiment, the window 1130 is semi-transparent and allows a partial view of the person 1110 that is covered by the window 1130 on the presenter desktop 1100. In another embodiment, the window 1130 is opaque and portions of the person 1110 that are covered by the window 1130 on the presenter desktop 1100.

In one embodiment, the window 1030 of FIG. 10A corresponds with the window 1130 of FIG. 11B. In one embodiment, the window 1030 in FIG. 10A represents a starting point and completely covers the annotation 1040. In one embodiment, the window 1130 represents an ending point and is positioned to the left of the annotation 1140. The annotation 1140 is shown in full view subsequent to the window 1130 being moved.

The foregoing descriptions of specific embodiments of the invention have been presented for purposes of illustration and description. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method comprising:
    sharing a desktop having content with an attendee device, wherein the desktop having content corresponds with a presenter device, and wherein the desktop having content includes a sliding type of window, the sliding type of window being a type of window used to alert a user of the presenter device that a new message is received on the presenter device;
    detecting a profile associated with the presenter device, wherein the profile comprises a default setting that indicates types of windows that are to be excluded from being shared with the attendee device;
    determining that the sliding type of window is indicated in the default setting of the profile and therefore should be excluded from being shared with the attendee device;
    in response to determining that the sliding type of window is indicated in the default setting of the profile, preventing the attendee device from displaying the sliding type of window;
    displaying the desktop having content including the sliding type of window on a display of the presenter device; and
    providing the desktop having content and excluding the sliding type of window to the attendee device for display on a display of the attendee device.

2. The method according to claim 1 wherein the sliding type of window is an alert that corresponds to an electronic mail message.

3. The method according to claim 1 wherein the desktop having content includes a shared window.

4. The method according to claim 3 further comprising simultaneously displaying the shared window and the sliding type of window on the presenter device.

5. The method according to claim 1 wherein the sliding type of window is an alert that corresponds to a chat message.

6. The method according to claim 1 further comprising highlighting the sliding type of window within the presenter device.

7. The method according to claim 1 further comprising annotating the content of the desktop from the attendee device.

8. The method according to claim 1 wherein the sliding type of window is semi-transparent.

9. A system, comprising:
    a processor; and
    a memory configured to store a plurality of software modules executable by the processor, the software modules including
        a window detection module configured to detect a desktop having content and a sliding type of window on the desktop, wherein the sliding type of window is a type of window used to alert a user of the system that a new message is received,
        a profile that includes a default setting that indicates types of windows that are to be excluded from being shared with an attendee device,
        an internal render module configured to display the desktop having content and the sliding type of window on a display of the system after initiation of the collaboration session, and
        an external render module configure to display the desktop having content, but not the sliding type of window, to a display of the attendee device after initiation of the collaboration session, based on the profile that includes the default setting that indicates the sliding type of window is a type of window that is to be excluded from being shared with the attendee device.

10. The system according to claim 9 further comprising a window selection module configured to identify the sliding type of window.

11. The system according to claim 9 wherein the sliding type of window is semi-transparent.

12. The system according to claim 9 wherein the sliding type of window is opaque.

13. The system according to claim 9 further comprising an interface module configured to allow the attendee device to modify the desktop having content.

14. A method comprising:
    selectively sharing a desktop having content, of a presenter device, with an attendee device, wherein the desktop having content includes a shared window and a sliding type of window, wherein the sliding type of window is a type of window used to indicate that a new message is received;
    detecting a profile associated with the presenter device, wherein the profile comprises a default setting that indicates types of windows that are to be excluded from being shared with the attendee device;
    determining that the sliding type of window is indicated in the default setting of the profile and therefore should be excluded from being shared with the attendee device;
    displaying the desktop having content including the sliding type of window on a display of the presenter device;
    detecting a modification to the desktop having content that is beneath the sliding is type of window wherein the modification is performed by the attendee device; and
    excluding the sliding type of window from the desktop having content that is displayed on the attendee device based on the sliding type of window being indicated in the default setting of the profile associated with the presenter device.

15. The method according to claim 14 wherein the sliding type of window is semi-transparent.

16. The method according to claim 14 further comprising simultaneously displaying the shared window and the sliding type of window on the presenter device.

17. The method according to claim 14 further comprising simultaneously displaying the modification, the shared window, and the sliding type of window on the presenter device.

18. The method according to claim 14 wherein the sliding type of window includes animated content.

19. The method according to claim 14 wherein the sliding type of window is distinguished from the shared window.

20. The method according to claim 14 wherein the sliding type of window is an alert that a new message is received.

* * * * *